(12) United States Patent
Shearn

(10) Patent No.: US 10,828,722 B2
(45) Date of Patent: Nov. 10, 2020

(54) MANUFACTURING METALLIC COMPONENTS HAVING INTEGRATED CRACK STOPPERS

(71) Applicant: Airbus Operations GmbH, Hamburg (DE)

(72) Inventor: Tom Shearn, Munich (DE)

(73) Assignee: Airbus Operations GmbH, Hamburg (DE)

( * ) Notice: Subject to any disclaimer, the term of this patent is extended or adjusted under 35 U.S.C. 154(b) by 1108 days.

(21) Appl. No.: 14/989,042

(22) Filed: Jan. 6, 2016

(65) Prior Publication Data
US 2016/0193697 A1 Jul. 7, 2016

(30) Foreign Application Priority Data
Jan. 7, 2015 (DE) .......................... 10 2015 100 088

(51) Int. Cl.
*B23K 26/342* (2014.01)
*B23K 15/00* (2006.01)
(Continued)

(52) U.S. Cl.
CPC .......... *B23K 26/342* (2015.10); *B22F 3/1055* (2013.01); *B23K 15/0086* (2013.01); *B33Y 10/00* (2014.12); *Y02P 10/25* (2015.11)

(58) Field of Classification Search
CPC . B22F 3/1055; B23K 15/0086; B23K 26/342; B33Y 10/00; Y02P 10/295; G05B 2219/49018
(Continued)

(56) References Cited

U.S. PATENT DOCUMENTS 6,595,467 B2 7/2003 Schmidt
8,610,027 B2 * 12/2013 Hovel .................. B22F 3/1055
164/492
(Continued)

FOREIGN PATENT DOCUMENTS

DE 10042132 A1 3/2002
DE 102006059851 A1 7/2008
(Continued)

OTHER PUBLICATIONS

Brice et al. (Determination of Bulk Residual Stresses in Electron Beam Additive-Manufactured Aluminum, NPL, 2013) (Year: 2013).*
(Continued)

*Primary Examiner* — Dana Ross
*Assistant Examiner* — James F Sims, III
(74) *Attorney, Agent, or Firm* — Jenkins, Wilson, Taylor & Hunt, P.A.

(57) ABSTRACT

This relates to a method of manufacturing a metallic component by additive layer manufacturing. The method comprises the step of providing a layer of granular metallic material. The layer of the granular metallic material is melted by a laser beam or electron beam which applies a defined scanning strategy, which is defined in such a way that a first region of the layer is melted before a second region of the layer such that during the subsequent solidification, residual stresses emerge in the first and the second region. These residual stresses act as integrated crack stoppers of the metallic component.

20 Claims, 2 Drawing Sheets

(51) Int. Cl.
*B22F 3/105* (2006.01)
*B33Y 10/00* (2015.01)

(58) Field of Classification Search
USPC .............. 219/76.12, 121.16, 121.17, 121.65, 219/121.66, 121.37, 121.38; 419/5, 8, 9
See application file for complete search history.

(56) References Cited

U.S. PATENT DOCUMENTS

| | | |
|---|---|---|
| 2012/0217226 A1 | 8/2012 | Bayer et al. |
| 2014/0025181 A1* | 1/2014 | Vanasse .................... A61F 2/28 623/23.55 |
| 2014/0299091 A1* | 10/2014 | Ribeiro ................. F02F 3/0084 123/193.6 |
| 2015/0004046 A1* | 1/2015 | Graham ................. B33Y 10/00 419/53 |

FOREIGN PATENT DOCUMENTS

| | | | |
|---|---|---|---|
| DE | 102012111022 A1 | 6/2014 | |
| DE | 102014116933 A1 * | 5/2016 | ......... B29C 67/0077 |
| EP | 1 291 279 B1 | 3/2004 | |
| EP | 2733060 A1 | 5/2014 | |
| EP | 2 754 515 A2 | 7/2014 | |

OTHER PUBLICATIONS

German Patent Office, German Search Report for German Patent Application No. 10 2015 100 088.1 dated Sep. 14, 2015.
German Office Action for Application No. 10 2015 100 088.1 dated Jun. 4, 2020.

\* cited by examiner

MANUFACTURING METALLIC COMPONENTS HAVING INTEGRATED CRACK STOPPERS

CROSS-REFERENCE TO RELATED APPLICATION

This application claims priority to German Patent Application No. 10 2015 100 088.1, filed Jan. 7, 2015, which is incorporated herein by reference in its entirety.

TECHNICAL FIELD

This relates to manufacturing metallic components with integrated crack stoppers by additive layer manufacturing. In particular, this relates to a method of manufacturing a metallic component by additive layer manufacturing.

BACKGROUND

The use of additive layer manufacturing (3D printing) becomes more and more relevant for manufacturing metallic components, for example, components of aircraft. For example, granular additive layer manufacturing methods such as direct metal laser sintering (DMLS), electron beam melting (EBM) and, or selective laser melting (SLM) can be used for manufacturing metallic components.

Metallic components of aircraft, which may be exposed to cyclic loads, may be provided with additional crack stopping structures, and are applied on the components, which minimize crack initiation and crack growth.

EP 1 291 279 B1 relates to a structural component and particularly a fuselage shell component for an aircraft, including a skin sheet and several stiffening profile members connected to the skin sheet at least partially by welding.

SUMMARY

There is a need to reduce the weight of metallic components having crack stoppers.

This relates to a method of manufacturing a metallic component by additive layer manufacturing, wherein a layer of granular metallic material is melted with a laser beam or an electron beam. The method comprises providing the layer of granular metallic material, defining a scanning strategy of the laser beam or electron beam for a melting sequence of the layer, and melting the layer with the laser beam or electron beam by applying the defined scanning strategy. The scanning strategy is defined in such a way that a first region of the layer is melted before a second region of the layer, which second region is adjacent to the first region, such that residual stresses in the first region and the second region emerge. The residual stresses act as integrated crack stoppers of the metallic component.

In other words, a method is presented where the metallic component is manufactured in such a way that the residual stresses, which act as integrated crack stoppers, are induced in the metallic component during the fabrication of the component by additive layer manufacturing. In this way, no additional method step for applying the crack stopper onto the metallic component is required. Therefore, the time required for manufacturing the metallic component is reduced. Moreover, it is not necessary that an additional crack stopping structure is applied onto the metallic component such that a more lightweight metallic component comprising crack stoppers can be manufactured.

In the context of the application, crack stoppers may relate to a structure (i.e. a region with residual stresses) of the metallic component, which prevents crack initiation and/or crack propagation.

The metallic component can refer to different kinds of metallic components. For example, the metallic component can be a metallic component of an aircraft. The metallic component may be a structural component of an aircraft that is exposed to cyclic loads, e.g. a frame or a stringer of an aircraft fuselage.

In the context of the present application, additive layer manufacturing may refer to 3D printing. For example, additive layer manufacturing may refer to direct metal laser sintering (DMLS), electron beam melting (EBM), or selective laser melting (SLM). Additive layer manufacturing of metallic components may be performed in such a way that a layer of granular metallic material is distributed on a support structure and that the metallic material is selectively melted by a laser beam or an electron beam such that the desired metallic component is formed. This procedure is repeated on a layer by layer basis such that the metallic component is built layer by layer. The granular metallic material can relate to different kinds of metallic materials and/or sizes of the granular particles. For example, the granular metallic material may be a metallic powder.

The scanning strategy, which is defined according to the method, may relate to a sequence with which the layer of granular metallic material is melted by the electron beam. For example, the scanning strategy may comprise an island scanning pattern, in which the layer is divided into smaller islands that are scanned randomly by the laser or electron beam. This scanning strategy may, for example, be defined with or by a computer system used for designing the metallic component and used for controlling the additive layer manufacturing device.

Subsequently, the layer of granular metallic material is melted by the laser beam or electron beam in such a way that the laser beam or electron beam applies the defined scanning strategy. In other words, the laser beam or electron beam may be configured to apply the sequence defined in the scanning strategy for melting the different areas of the layer of granular material.

The scanning strategy of the laser may be optimized in such a way, that sub-surface regions (i.e. the second region) may be melted at the end of each layer such that sub-surface tensile regions emerge, which are due to the time shift of the solidification and contraction of the final regions treated. The creation of these internal tensile regions may induce compressive forces on the surrounding material. The location of these regions may be optimized in a surface layer, which may result in the compression of the surface layers, which limits crack propagation and improves fatigue life.

Thus, it may be understood that there is a specific period of time between the melting of the first region and the melting of the second region. This time period between the melting of the first region and the second region is specifically selected in such a way that residual stresses in the first and second region emerge during the subsequent solidification of the granular material, which residual stresses act as integrated crack stoppers of the metallic component. In other words, the crack stoppers are included in the metallic component and there is no need for applying an additional crack stopper onto the surface of the metallic component.

According to an exemplary embodiment, the scanning strategy is defined in such a way that compressive residual stresses emerge in the first region and tensile residual stresses emerge in the second region.

The residual stresses may have a strength that is greater than 10 MPa, preferably greater than 50 MPa, even more preferred greater than 100 MPa.

According to a further exemplary embodiment, the scanning strategy is defined in such a way that the second region of the layer is melted at the end of the melting sequence of the layer.

For example, the scanning strategy is defined in such a way that the other regions, which may be adjacent to the second region, are melted before the second region. Furthermore, the scanning strategy may be defined in such a way, that the first region, which is adjacent to the second region, is melted a certain time period before the second region, wherein this time period is specifically chosen such that the residual stresses in the first and second region emerge.

The time period between melting the first region and the second region may be in the order of 10 s of seconds. The time period may depend on the level of residual stresses desired, the power of the laser and the defined temperature in the build chamber.

According to a further exemplary embodiment, the scanning strategy is defined in such a way that the second region is melted during the melting sequence of the layer and is re-melted at the end of the melting sequence of the layer.

For example, the first region and the second region of the layer of granular material may be melted using a standard scanning strategy first and subsequently the second region of the layer may be re-melted such that stresses emerge in the first region and the second region during the hardening process of the layer.

According to a further exemplary embodiment, the layer is a surface layer of the metallic component.

In other words, the layer, which comprises the compressive residual stresses which act as crack stoppers is located on the surface layer or near the surface layer of the metallic component. It may be understood that the surface layer may be a layer defining an outer surface of the metallic component. By providing compressive residual stresses on the surface of the metallic component, crack initiation or propagation can be reduced by artificially inducing a crack closure by the compressive residual stresses.

According to a further exemplary embodiment, the scanning strategy is defined in such a way that the metallic component has a planar surface comprising the residual stresses.

In other words, the metallic component does not comprise crack stopping structures which protrude from the surface of the metallic component.

According to a further exemplary embodiment, the steps of providing the layer of granular metallic material, defining the scanning strategy of the laser beam or electron beam, and melting the layer with the laser beam or electron beam as described in the context of the invention are repeated on a layer by layer basis.

In other words, a similar strategy is applied for a plurality of subsequent layers such that the regions comprising residual stresses are extended over several layers.

A further exemplary embodiment relates to a method described in the context of the present invention for manufacturing an aircraft structural component.

The aircraft structural component may for example be a bracket, a frame or a stringer.

According to a further exemplary embodiment, the added layer manufacturing comprises direct metal laser sintering, electron-beam melting or selective laser melting.

It has to be noted that the method steps can be carried out in the order described in the context of the present application. Furthermore, the method steps may also be performed in another order or parallel to each other.

The aspects described above and further aspects, features and advantages may also be found in the exemplary embodiments, which are described in the following with reference to the appended drawings.

BRIEF DESCRIPTION OF THE DRAWINGS

The various embodiments will hereinafter be described in conjunction with the following drawing figures, wherein like numerals denote like elements, and.

The figures are schematic and not true to scale. If in the following description the same reference signs are used with respect to different figures, they may refer to the same or similar elements. The same or similar elements may also be referenced by different reference signs.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
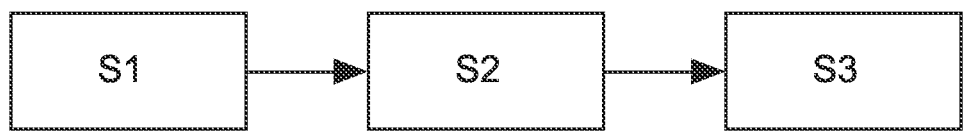
FIG. 1 shows a flow-chart of a method according to an exemplary embodiment.

In FIG. 1, a flow-chart for a method of manufacturing a metallic component by additive layer manufacturing according to an exemplary embodiment is shown. In additive layer manufacturing, a layer of granular metallic material is melted with a laser beam or an electron beam. The method comprises step S1 of providing the layer of a granular metallic material, step S2 of defining a scanning strategy of the laser beam or electron beam for a melting sequence of the layer, and step S3 of melting the layer with the laser beam or electron beam by applying the defined scanning strategy. The scanning strategy is defined in such a way that the first region of the layer is melted before a second region of the layer, which second region is adjacent to the first region, such that residual stresses in the first region and the second region emerge. Moreover, the residual stresses act as integrated crack stoppers of the metallic component as explained in the context of the application.

Figure 2:
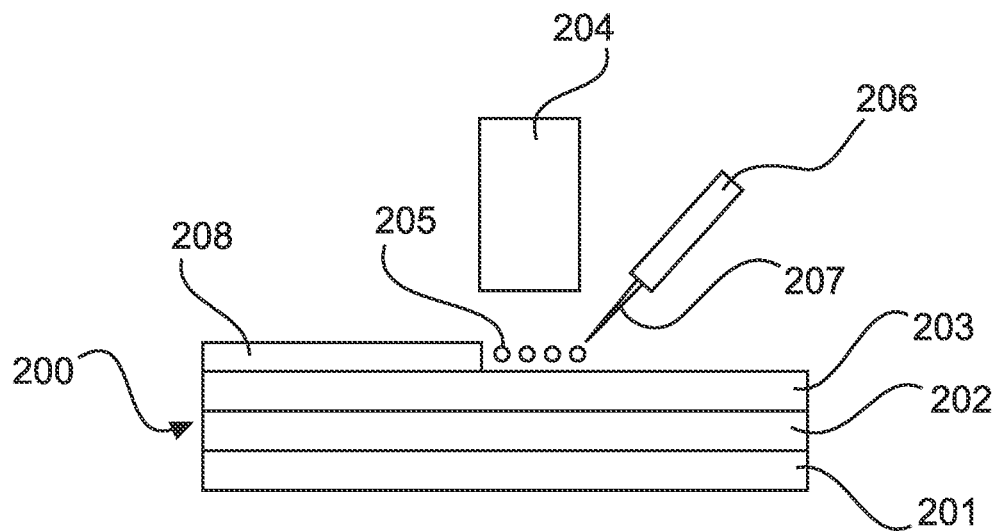
FIG. 2 shows the manufacturing of a metallic component by additive layer manufacturing according to an exemplary embodiment.

In FIG. 2, the manufacture of a metallic component 200 by additive layer manufacturing is shown. The metallic component 200 comprises several layers 201, 202 and 203 which are added by additive layer manufacturing. Furthermore, a further layer 208 is added onto the metallic component 200. This is done in such a way that a depositing device 204 deposits a layer of granular material 205. This granular material is melted by a laser beam 207 or 206. Melting the granular material 205, the laser 206 and the laser beam 207 apply a defined scanning strategy, which is defined in such a way that a first region of the layer is melted before a second region of the layer, which second region is adjacent to the first region, such that residual stresses in the first region and the second region emerge, which residual stresses act as integrated crack stoppers of the metallic component. For example, the layer 208 is a surface layer of the metallic component, i.e. an outer layer of the metallic component.

Figure 3:
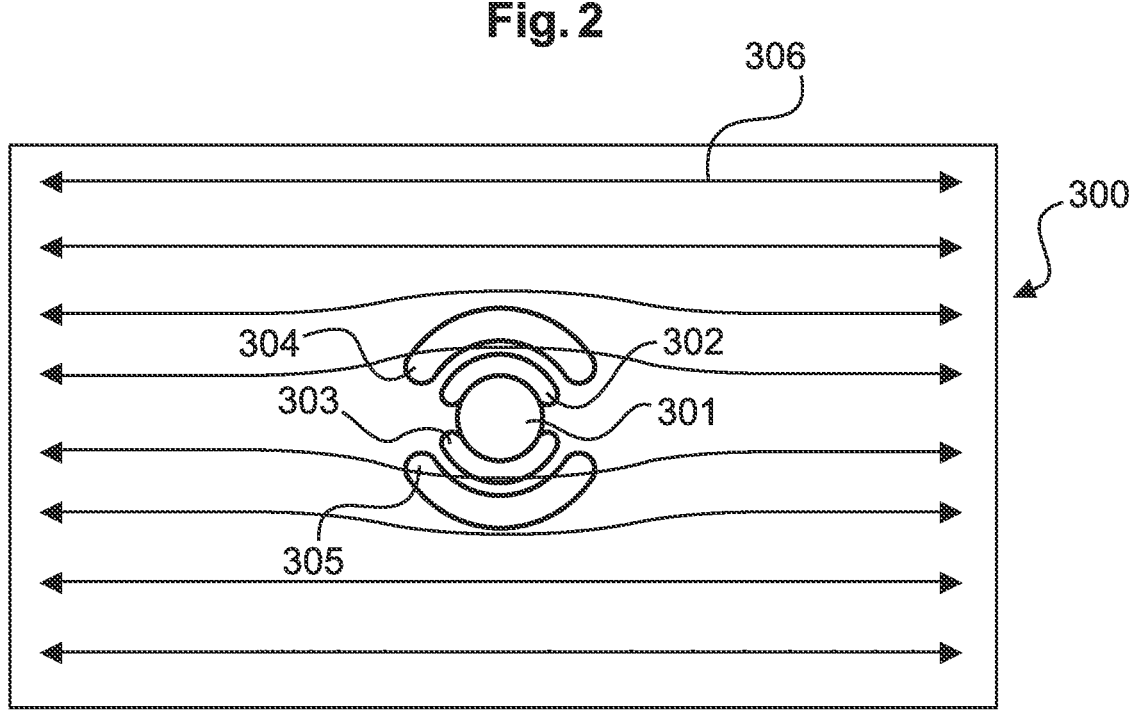
FIG. 3 shows a cross section of a metallic component according to an exemplary embodiment.

In FIG. 3, a cross section of a metallic component 300 according to an exemplary embodiment is shown. The arrows 306 indicate the cyclic loads to which the metallic component 300 will be exposed. Furthermore, it is shown that the metallic component comprises a hole 301. Due to the cyclic loads, risk of initiation of cracks in the region of the hole, which cracks extend substantially in a perpendicular direction of the cyclic loads, is increased. Thus, it is desired to provide crack stoppers adjacent to the hole 301, which minimize the risk of crack initiation and propagation perpendicularly to the cyclic loads 306.

Therefore, the scanning strategy of the laser is defined in such a way, that first regions 302 and 303, which are adjacent to the hole 301, are melted before second regions 304 and 305. In this way, compressive residual stresses will emerge in the first regions 302 and 303 and tensile residual stresses will emerge in the second regions 304 and 305 after solidification of the granular material. In other words, the identification of regions which are prone to crack initiation and crack propagation is shown in FIG. 3. Thus, first regions 302 and 303 are identified, in which compressive residual stresses are desired such that crack closure is artificially induced on the surface of the metallic component. In order to induce these desirable compressive residual stresses in the first regions 301 and 302, tensile residual stresses in the second regions 304 and 305 are induced.

In FIGS. 4A to FIGS. 4F, a scanning strategy defining a melting sequence for inducing the regions 302, 303, 304 and 305 according to an exemplary embodiment oare shown.

Figure 4A:
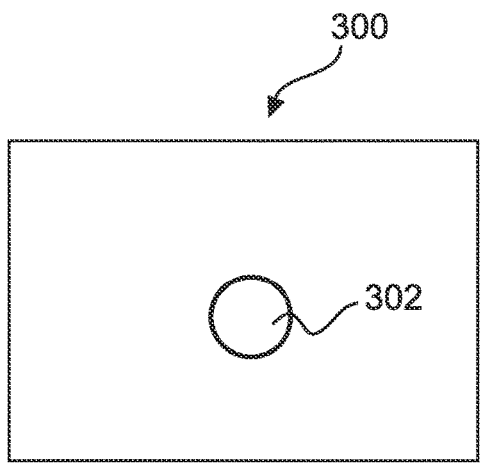
FIGS. 4A-4F show different stages of melting a layer of a metallic component according to an exemplary embodiment.

In FIG. 4A, it is shown that the metallic component 300 is orientated in such a way that the desired compressive residual stresses lie in the xy-plane (where the z-axis is considered to be the vertical built direction for the additive manufacturing). In this exemplary embodiment, the xy-plane is the plane of the drawing of FIG. 4A to FIG. 4F.

Figure 4B:
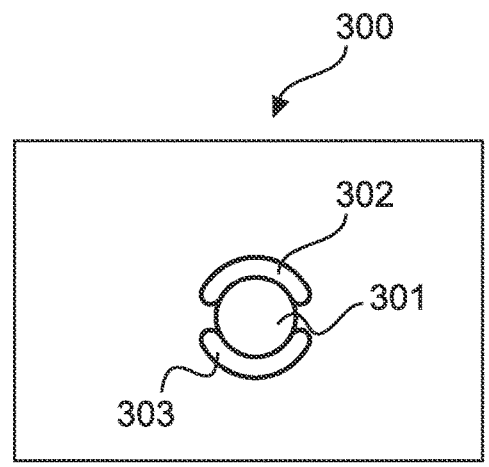

In FIG. 4B, it is shown that the laser path is defined in such a way that the first regions 302 and 303 are selectively processed towards the beginning of the melting sequence of the layer.

Figure 4C:
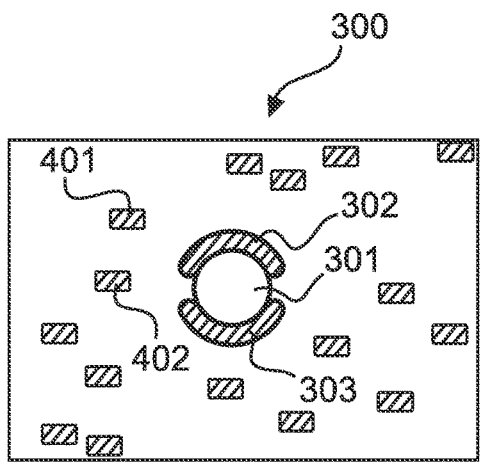
Figure 4D:
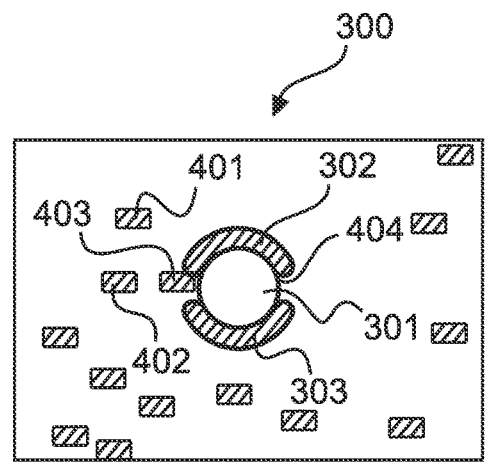

In FIGS. 4C and 4D, it is shown that the rest of the area of the layer to be melted is processed using existing scanning patterns. It is exemplarily shown, that the rest of the layer is melted using an island scanning pattern, where islands 401, 402 of the layer are randomly melted. In this way, the residual stresses in the rest of the component can be reduced such that only residual stresses in the first and second regions will emerge. In FIG. 4D, it is further shown that additional islands 403 and 404 are melted randomly.

Figure 4E:
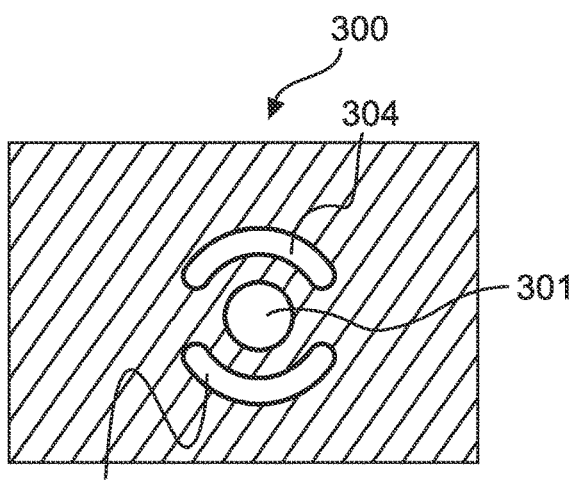

In FIG. 4E, it is shown that the complete layer of the component 300 apart from the second regions 304 and 305 is melted.

Figure 4F:
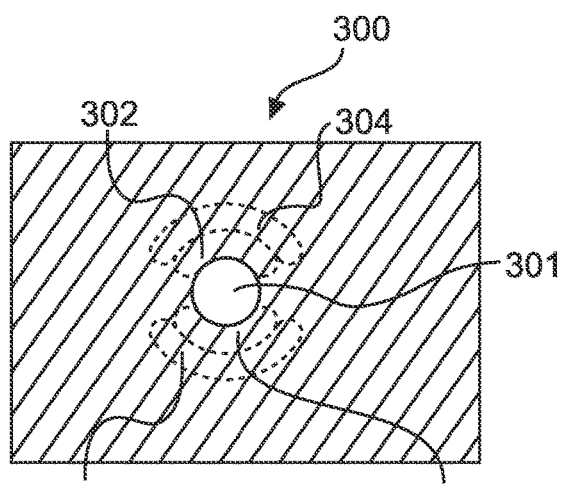

In FIG. 4F, it is shown that the second regions 304 and 305, which will comprise the tensile residual stresses, are melted at the end of the melting sequence. In this way, the solidification of the second regions 304 and 305 occurs later than the solidification of the first regions 302 and 303 such that compressive residual stresses emerge in the first regions 302 and 303 and tensile residual stresses emerge in the second regions 304 and 305.

Alternatively the complete layer may be melted first by applying a standard scanning strategy for the complete layer including the first and second region, e.g. by applying island scanning patterns, and the second regions 304 and 305 may be re-melted at the end of the melting sequence of the layer.

For subsequent layers, a similar strategy is applied such that the stresses of the previous layer are extended into the next layer.

In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. The reference numerals in the claims are not intended to restrict the scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method of manufacturing a metallic component, which has a hole formed through the metallic component and has integrated crack stoppers, by additive layer manufacturing, wherein the metallic component is cyclically loaded in a first direction, which is a radial direction of the hole, the method comprising:
providing a layer of a granular metallic material;
defining a scanning strategy of the laser beam or electron beam for a melting sequence of the layer, wherein the scanning strategy comprises defining a first region of the layer, which is arranged radially about and adjacent to the hole in a second direction orthogonal to the first direction and is formed to have a compressive residual stress, and defining a second region of the layer, which is formed after the first region is melted and has a tensile residual stress, wherein the second region is arranged radially about and adjacent to the first region in the second direction; and
melting the layer with a laser beam or an electron beam by applying the scanning strategy.

2. The method according to claim 1, wherein melting the layer with the laser beam or electron beam by applying the scanning strategy comprises melting the second region of the layer at the end of the melting sequence of the layer.

3. The method according to claim 1, wherein melting the layer with the laser beam or electron beam by applying the scanning strategy comprises melting the second region during the melting sequence of the layer and re-melting the second region at the end of the melting sequence of the layer.

4. The method according to claim 1, wherein the layer is a surface layer of the metallic component.

5. The method according to claim 1, wherein melting the layer with the laser beam or electron beam by applying the defined scanning strategy comprises forming the metallic component with a planar surface comprising the first region of the layer with the compressive residual stress and the second region of the layer with the tensile residual stress.

6. The method according to claim 1, further comprising:
providing a second layer of a granular metallic material;

defining a second scanning strategy of the laser beam or electron beam for a second melting sequence of the second layer, wherein the second scanning strategy comprises defining a first region of the second layer, which is formed to have a compressive residual stress and defining a second region of the second layer, which is formed after the first region of the second layer is formed and has a tensile residual stress, wherein the second region of the second layer is adjacent to the first region of the second layer; and melting the second layer of the granular metallic material with the laser beam or the electron beam by applying the second scanning strategy.

7. The method according to claim 1 further comprising manufacturing an aircraft structural component.

8. The method according to claim 1, wherein added layer manufacturing comprises direct metal laser sintering.

9. The method according to claim 1, wherein added layer manufacturing comprises electron-beam melting.

10. The method according to claim 1, wherein added layer manufacturing comprises selective laser melting.

11. The method according to claim 1, wherein the first region of the layer at least partially surrounds the hole.

12. The method according to claim 1, wherein the first region of the layer contacts the hole.

13. The method according to claim 1, wherein the first direction and the second direction are coplanar with a plane defined by the layer of the granular metallic material.

14. A method of integrating crack stoppers in a metallic component, which has a hole formed through the metallic component and is cyclically loaded in a first direction, which is a radial direction of the hole the method comprising:

providing a layer of a granular metallic material;
defining a first region of the layer arranged radially around and adjacent to the hole in a second direction orthogonal to the first direction;
melting the first region of the layer with a laser beam or electron beam;
defining a second region of the layer arranged radially about and adjacent to the first region in the second direction;
after melting the first region of the layer, melting the second region of the layer with the laser beam or electron beam; and solidifying the second region after solidifying the first region, such that the first region has compressive residual stresses and the second region has tensile residual stresses.

15. The method of claim 14, further comprising, after melting the first region of the layer and before melting the second region of the layer, randomly melting islands of the layer, wherein the islands do not overlap with the second region.

16. The method of claim 14, wherein melting the first region of the layer with the laser beam or electron beam comprises melting the entire layer by applying island scanning patterns with the laser beam or electron beam.

17. The method according to claim 14, wherein the first direction and the second direction are coplanar with a plane defined by the layer of the granular metallic material.

18. A method of performing additive layer manufacturing to form a metallic component, which has a hole formed through the metallic component, has integrated crack stoppers, and is cyclically loaded in a first direction, which is a radial direction of the hole, the method comprising:

providing a layer of a granular metallic material;
defining a first region of the layer arranged radially around and adjacent to the hole in a second direction orthogonal to the first direction;
defining a second region of the layer arranged radially about and adjacent to the first region in the second direction;
defining smaller islands from a remainder of the layer;
melting the first region of the layer;
solidifying the first region of the layer;
melting islands of the layer according to a random pattern;
solidifying the islands of the layer;
melting the second region of the layer; and
solidifying the second region of the layer after solidifying the first region such that the first region has compressive residual stresses and the second region has tensile residual stresses.

19. The method according to claim 18, wherein the first region of the layer contacts the hole.

20. The method according to claim 18, wherein the first direction and the second direction are coplanar with a plane defined by the layer of the granular metallic material.

\* \* \* \* \*